TWO-STATION PARTY LINE SWITCHING IN TELEPHONE SYSTEMS

Filed March 28, 1955 2 Sheets-Sheet 1

Inventor:
Eugen Jauch.
By [signature] Atty.

Inventor:
Eugen Jauch.
By [signature] Atty.

United States Patent Office 2,933,561

Patented Apr. 19, 1960

2,933,561

TWO-STATION PARTY LINE SWITCHING IN TELEPHONE SYSTEMS

Eugen Jauch, Munich, Germany, assignor to Siemens & Halske Aktiengesellschaft, Munich, Germany, a corporation of Germany Application March 28, 1955, Serial No. 497,300
In Germany February 1, 1950

Public Law 619, August 23, 1954
Patent expires February 1, 1970

7 Claims. (Cl. 179—17)

Figure 1:
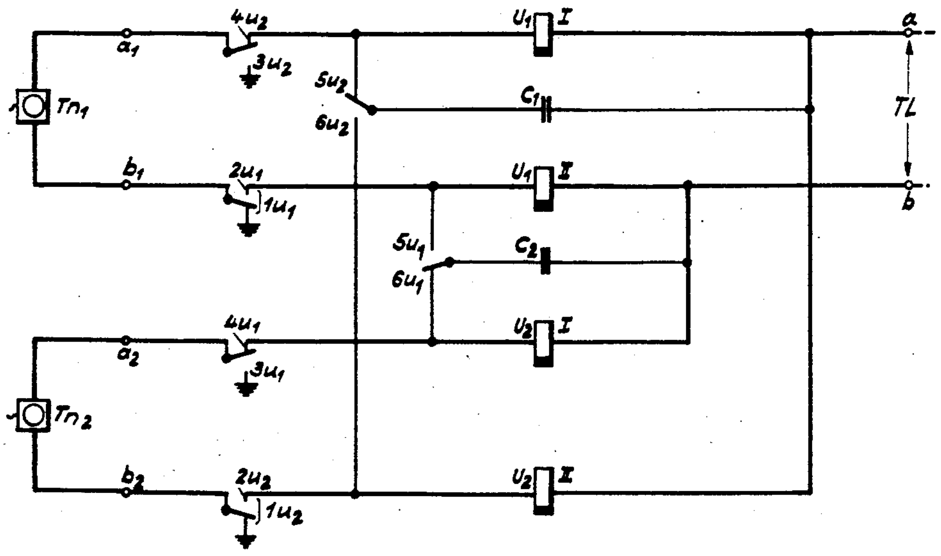

This invention is concerned with two-station party line switching in telephone systems.

The requirement for line relays for telephone lines is that they will with certainty remain normal in the presence of a certain minimum value of the insulation of the line conductors. At this minimum value of the insulation resistance, the relays on the line should neither energize nor should they, in the most unfavorable case, continue to be maintained operated. These requirements can be met, for example, with an insulation resistance of the lines of about 20,000 ohms. An insulation of this order of magnitude is no longer sufficient when the line relays have relatively high resistance, as is the case with the line relays of a two-station party line.

Since there is, in each branch line leading to the two subscribers, a gate relay having two windings, which upon initiation of an outgoing call must remain at normal, the corresponding line relay in the exchange must have high resistance. There are cases, however, in which the line relay, after having been energized responsive to the extension of a call, is still in energized condition after termination of the call or is switched back to such condition. With the normally allowed minimum insulation resistance of the line, in the case of a ground or cross connection, the holding current, which is low in itself, is no longer weakened to the extent that the relay is caused to release. It falsely continues to be energized and simulates a new call.

It would be possible to avoid this difficulty by increasing the permissible insulation resistance of the line, for example, to twice its value. The result would be, however, that the lines would have to be serviced much more carefully to maintain the desired insulation value. It would also be possible to eliminate this difficulty by using additional switching means, for example, an additional relay. This, however, would result in higher maintenance cost or increased cost of equipment, which is to be avoided.

The main object of the invention is to provide an arrangement for two-station party lines, which does not require an increase in the normal insulation resistance of the line conductors, thus making it possible to retain the minimum insulation resistance which is permissible for individual lines. The advantage of this arrangement is that all subscriber lines can be treated uniformly with respect to operation and maintenance, which is particularly important when using preselector circuits universally for individual lines as well as for party lines.

The object of the invention is realized in that the two windings of the respective gate relays, which for reasons of symmetry are disposed in known manner each in a line conductor of the corresponding branch line, are no longer connected in the line circuit simultaneously, in contrast to the arrangement known heretofore, but that until the corresponding gate relay energizes, the line circuit extends only over one winding thereof, and after energization of such relay and extension of the conductors, over both windings. The result of this symmetric subdivision of the gate relay into an actuating and a holding winding is that upon initiation of an outgoing call only one winding of the gate relay is connected in series with the line relay. The resistance of the line relay can accordingly be reduced to half the resistance of comparable line relays used in previous systems while maintaining for the gate relay the condition that it must not be operatively actuated responsive to current over the relay in case of an outgoing call. The reduction of the resistance of the line relay results in a reduction of the number of turns of the windings and an increase in the thickness of the wire. On the other hand, owing to the reduction of the resistance of the line relay, the minimum insulation resistance required also for individual lines is sufficient to make the effect of ground and cross connections on the relay harmless.

In two-station lines where the call of one subscriber extends over one line conductor and the call of the other subscriber over the other line conductor of the common exchange line, the line relay in the exchange which starts the preselector has two windings, one of which, upon initiation of an outgoing connection by one subscriber, is energized over one line conductor, and upon initiation of an outgoing call by the other subscriber, through the other line conductor. After the preselector has been switched through to an idle impulse responsive switch, the line relay is disconnected from the subscriber line. If separate call meters are provided in the exchange for the two stations on the party line, the operative connection of the particular meter in question is made dependent on whether or not the line relay remains energized after its disconnection from the exchange line. This different operating condition of the line relay is obtained in that the winding energized over one conductor of the party line is disconnected by the other winding on the other line conductor which serves for the outgoing connection of the second station, after extension of the preselector to an idle impulse responsive switch. This winding is in differential circuit connection with the first winding and is in this case energized in a local circuit.

According to another object and feature of the invention, the effect of this differential circuit connection with respect to ground and cross connections is improved, by subdividing the resistance, which is obtained by subdividing only the energizing winding of the gate relay and which is the same for both windings of the line relay, thereby forming a series resistance common to both windings of the line relay and reducing the coil resistance correspondingly. If the series resistance is properly dimensioned, a larger number of ampere turns will result in the two windings in the case of ground or cross connections in the magnitude of the permitted insulation resistance than with a direct connection of the two windings of the line relay to the exchange battery voltage.

Figure 2:
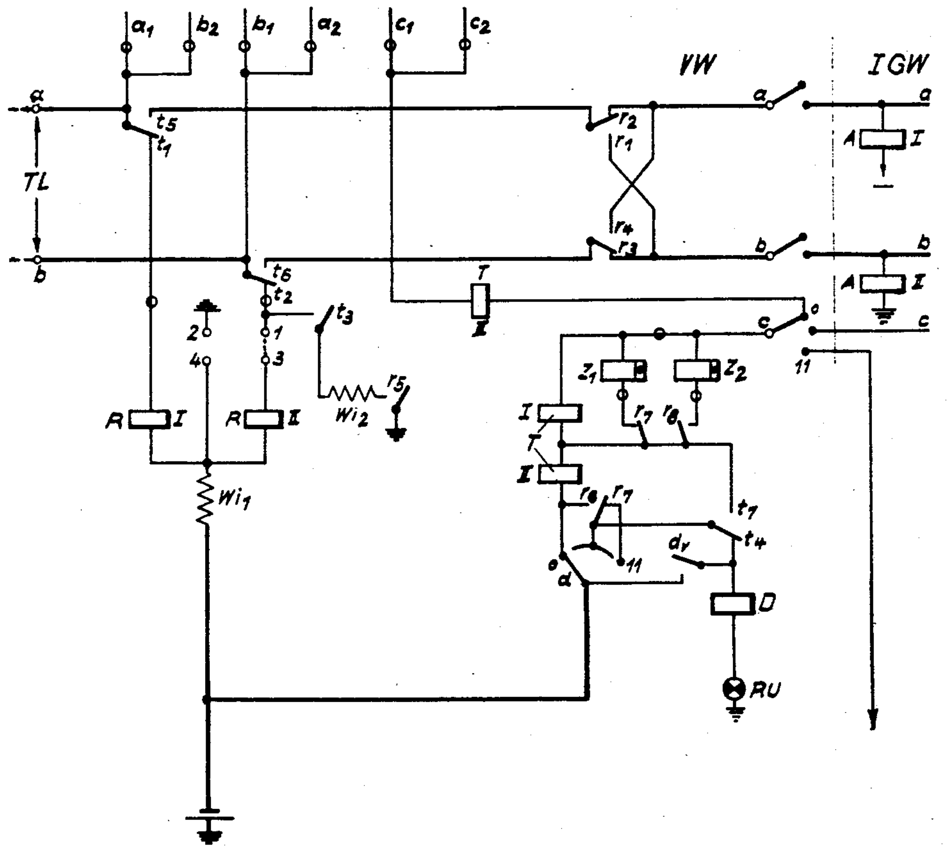

The appended drawings Figs. 1 and 2 when taken together with the conductors at the right of Fig. 1 in alignment with corresponding conductors at the left of Fig. 2 show an embodiment of the invention.

Fig. 1 shows the two pairs of line conductors *a1*—*b1* and *a2*—*b2* for the two stations T*n*1 and T*n*2. In the respective line conductors are disposed the two windings of the corresponding gate relays U1 and U2. At the exchange end, the exchange line TL extends for outgoing calls in usual manner to the wipers *a*, *b*, *c* of a preselector VW. Incoming calls are extended by connectors (not shown) to the stations of the two-party line. Depending on the desired station or subscriber, the line conductors are in known manner crossed or reversed in the connector, or in the case of two connector outlets, in back of the connector, so as to call subscriber T*n*1 over the *a*-conductor, and subscriber T*n*2 over the *b*-conductor. The second case is indicated in Fig. 2 by the lines *a*1—*b*2 coming from a connector, connected to the *a*-conductor, and the lines *b*1—*a*2, connected to the *b*-conductor.

In the following description the plus symbol indicates the normally grounded positive pole of the exchange battery, while the minus symbol indicates the negative pole of the battery.

It is believed that a description of outgoing calls will be sufficient for an understanding of the invention.

When the subscriber at the station T*n*1 wishes to extend a call, the subscriber loop will be closed responsive to removal of the receiver, thereby completing a circuit for the line relay R of the preselector VW which extends from +, 1*u*1, subscriber loop 4*u*2, $U_1$I, *a*-conductor *t*1, high resistance winding RI of the line relay, WI1 to —. Only the line relay R of the preselector responds over its high resistance winding, the gate relay U1 remaining normal.

The starting circuit for the rotary magnet D of the preselector is closed in the usual manner over contact *r*6 actuated by relay R, from +, relay interrupter RU, D, *t*4, *r*6, wiper *d* to —. The preselector rotates its wipers step-by-step until a trunk leading to an idle first group selector IGW is found, when the test relay T of the preselector VW energizes in the usual manner over its windings I and II and the *c*-conductor to the first group selector. By opening of the contacts *a*4, relay T, on the one hand, disconnects the rotary magnet D thereby stopping the preselector; on the other hand, the seized line is blocked against other seizure by short-circuiting the high resistance winding II or reyal T over contact *t*7.

Upon energizing of relay T, the high resistance winding RI of the line relay is disconnected from the *a*-conductor at the contact *t*1. At the same time, during the release interval of the relay R, an opposing winding RII is connected in the circuit extending from +, *r*5, W*i*2, *t*3, 1—3, RII, W*i*1 to —, so as to assure reliable release of the relay R. Upon release of relay R, the meter Z1 which is associated with subscriber T*n*1 is connected to the *c*-conductor over contact *r*7 in the usual manner, parallel to the low resistance winding I of test relay T.

The reversal of the two line conductors existing during the energization of the line relay R at contacts *r*1 and *r*4 is eliminated. It should be added here that upon energization of relay T, the two line conductors are at contacts *t*5 and *t*6 switched through. At the same time winding II of the line relay R is disconnected from the *b*-conductor by opening of contact *t*2.

After extension of the two line conductors from the preselector VW to the first group selector IGW, the gate relay U1 of subscriber T*n*1 which is now in series with the low resistance winding 1 of the line relay A in the first group selector, energizes in the following circuit extending from +, 1*u*1, subscriber loop, 4*u*2, U1 winding I, *a*-conductor, *t*5, *r*2, wiper *a* of the preselector, AI to —. Relay U1 energizes and by opening contact 4*u*1 disconnects subscriber station T*n*2 from the party line. By closing contact 2*u*1, the *b*-conductor to the first group selector is switched through. The gate relay U1 is now maintained energized over its two windings in a circuit extending from +, winding AII of line relay A in the group selector IGW, wiper *b* of preselector VW, *r*3, *t*6, *b*-conductor, U1 winding II, 2*u*1, subscriber loop, 4*u*2, U1 winding I, *a*-conductor, *t*5, *r*2, wiper *a* of the preselector, AI to —. The gate relay U1, at contact 5*u*1 connects the capacitor C2 parallel to its winding II.

Further operations occurring in the establishment of the connection are of no interest for the invention and description thereof is accordingly deemed unnecessary.

Release of the call is initiated by the calling subscriber T*n*1 replacing the receiver. The subscriber loop is thereby interrupted causing release of the line or battery feed relay A in the first group selector and of the gate relay U1 at the subscriber end. The release of relay A in the first group selector causes in known manner (not shown) interruption of the *c*-conductor to the preselector. The test relay T in the preselector restores. A circuit for the rotary magnet D is thereby again closed over contact *t*4, and the contact segment engaged by wiper *d*. Driven by the relay interrupter RU, the rotary magnet moves the wipers of the preselector *a*—*d* step-by-step into home position, in which the circuit for the rotary magnet is interrupted. Upon relay T, the two windings of the line relay R are again connected to the line conductors.

If subscriber T*n*2 desires to extend an outgoing call, the subscriber loop is closed upon lifting the receiver, and a circuit is closed for the line relay R in the preselector VW, extending from +, 1*u*2 T*n*2, 4*u*1,U2I, *b*-conductor, *t*2, 1—3, RII, W*i*1 to —.

In this circuit the line relay R energizes over its winding II which is just as its winding I a high resistance winding, but the gate relay U2 remains normal, just as gate relay UI remained normal in series with winding I of line relay R incident to initiation of a call from a subscriber station T*n*1. As described before, relay R, upon energization of winding II, closes a circuit for the rotary magnet D of the preselector extending over the relay interrupter RU; the rotary magnet moves the wipers of the preselector step-by-step over the respectively associated bank contacts until an idle dial pulse receiver (group selector) has been found, when the test relay T is energized; the latter stopping the operation of the preselector, blocking the seized trunk against other seizure by short-circuiting of the high resistance winding TII, and switching the two line conductors through. The two windings I and II of the line relay R are at the same time disconnected from the line conductors. Relay R, however, is after actuation of relay T maintained operated in a circuit extending from +, *r*5, W*i*2, T3, 1—3, RII, W*i*1 to —. By means of its contacts *r*1 and *r*4 relay R reverses the two line conductors, and by opening of contact *r*7, the meter Z1 associated with the subscriber station T*n*1 is disconnected, while over contact *r*8, the meter Z2, associated with the calling subscriber station T*n*2 is connected to the *c*-conductor parallel to the low resistance winding I of relay T.

After the line conductors in the preselector VW have been switched through, the gate relay U2 of the calling subscriber station is energized over its winding I in series with the low resistance winding I of the battery feed or line relay A of the seized group selector in a circuit extending from +, 1*u*2, T*n*2, 4*u*1, U2I, *b*-conductor, *t*6, *r*4, wiper *a* of the preselector, A1 to —. Relay U2 disconnects the subscriber station T*n*1 from the party line by opening contact 4*u*2 and switches the lower line conductor of the subscriber branch T*n*2 through by closing contact 2*u*2. Relay U2 also connects the capacitor C1 parallel to its winding II. The lower line conductor of the branch line of subscriber T*n*2 having been switched through, the gate relay U2, is maintained energized over its two windings in a circuit extending from +, AII, wiper *b* of the preselector, *r*1, *t*5, *a*-conductor, U2II, 2*u*2,T*n*2, 4*u*1, U2I, *b*-conductor, *t*6, *r*4, wiper *a* of the preselector, AI to —.

Further operations relating to the building up of the call are as in the first assumed call station T*n*1 of no importance for the invention and description thereof is accordingly deemed unnecessary. It may, however, be mentioned that after extension of the call, the two windings of the gate relay U2, with a capacitor parallel to each of them (capacitor C1 parallel to U2II and capacitor C2 parallel to U2I), are disposed symmetrically in the two line conductors. This condition is also present with respect to the windings of relay U1 when a call is extended from station T*n*1.

Release of the connection occurs upon replacement of the receiver at the calling subscriber station. The subscriber loop is thereby interrupted resulting in release of the line or battery feed relay A in the first group selector. By the release of relay A, the *c*-conductor to the preselector VW is in known manner interrupted. In the preselector, the test relay T and the line relay R are caused to restore. Relay T connects the rotary magnet D for operation over the relay interrupter RU, the corresponding circuit extending over the contact segment swept by the wiper *d*. The preselector moves its wipers into the normal or home position. Relay T having deenergized, the two windings of the line relay R are again connected to the line conductors and ready for operation in a subsequent call.

It may be mentioned in conclusion that the preselector circuit shown in the drawings may serve also for connecting individual subscribers. In this case the connection between the points 1—3 is interrupted, and the points 1—2 and 3—4 are respectively connected, thereby shunting the winding RII and directly grounding the *b*-conductor.

Changes may be made within the scope and spirit of the appended claims.

I claim:

1. In a telephone system having a two-station party line comprising two principal line conductors leading to an exchange and having two branches extending from said principal line conductors, each branch having two station-line conductors leading to the station corresponding to such branch, first and second control means at the exchange each having an electrical resistance of predetermined magnitude normally respectively connected to one of said principal line conductors, further control means in said exchange forming an electrical resistance of a magnitude lower than that of said first and second control means, said further control means normally disconnected from said principal line conductors, a gate relay for each of said branches comprising two windings disposed in series with the respective station-line conductors to form a symmetrical arrangement therefor, one of said two windings of each gate relay constituting an energizing winding and the other constituting a holding winding, circuit means including means controlled by said gate relays for normally placing a ground potential at a point between each station and the holding winding of the gate relay respectively associated therewith whereby upon extension of a call from either one of said stations only the energizing winding of the corresponding gate relay will be connected to one of said principal line conductors in series with that one of the first and second control means which is at the exchange normally connected to such line conductor, the corresponding gate relay remaining non-actuated due to the magnitude of the electrical resistance of the corresponding control means, means at the exchange for thereafter connecting direct current to both said principal line conductors by way of said further control means to cause energization of the corresponding gate relay over the energizing winding thereof and means controlled by such gate relay upon energization thereof for connecting its holding winding in a holding circuit extending in series with said energizing winding.

2. A system and cooperation of parts according to claim 1, comprising a line relay at the exchange having two windings respectively connected to said principal line conductors, said windings constituting said first and second control means.

3. A system and cooperation of parts according to claim 1, wherein said circuit means comprises circuit means included in the station from which a call is being extended and further comprising one of said station-line conductors terminating in open contact means extending to the holding winding of said gate relay.

4. A system and cooperation of parts according to claim 1, comprising a preselector at the exchange including a line relay having two windings respectively connected to said principal line conductors, said windings constituting said first and said second control means, said line relay energizing in the circuit in series with said energizing winding of the corresponding gate relay for controlling the operation of said preselector to extend the call to an idle impulse responsive group selector, said group selector comprising a further line relay forming part of said further control means and having a winding connected to a line conductor thereof which extends after extension of said call by said preselector to said energizing winding of said gate relay.

5. A system and cooperation of parts according to claim 1, comprising a preselector at the exchange including a line relay having two windings respectively connected to said principal line conductors, said windings constituting said first and said second control means, said line relay energizing in the circuit in series with said energizing winding of said gate relay for controlling the operation of said preselector to extend the call to an idle impulse responsive group selector, said group selector comprising a further line relay forming part of said further control means and having a pair of windings respectively connected to the line conductors thereof which extend after extension of said call by said preselector respectively to the two windings of said gate relay of the calling station, said holding circuit including the two windings of said gate relay and the line conductors and the two windings of the line relay of said group selector.

6. A system and cooperation of parts according to claim 1, comprising a preselector at the exchange including a line relay having two windings respectively connected to said principal line conductors, said windings constituting said first and said second control means, and means for connecting each of said two windings of said line relay in the exchange with a current source over a common resistor.

7. A system and cooperation of parts according to claim 6, wherein the ratio of resistance of said common resistor to the resistance of one of said windings of said line relay is on the order of about 1:3.

References Cited in the file of this patent

UNITED STATES PATENTS

| | | |
|---|---|---|
| 2,090,172 | Wolf | Aug. 17, 1937 |
| 2,106,881 | Wolf | Feb. 1, 1938 |
| 2,245,799 | McLew | June 17, 1941 |